United States Patent [19]

Muraoka et al.

[11] Patent Number: 5,542,991

[45] Date of Patent: Aug. 6, 1996

[54] RAIL FOR A LINEAR MOTION GUIDE BEARING

[75] Inventors: Tomoki Muraoka; Tsutomu Abe, both of Kanagawa; Kazuhiro Kobayashi; Kenichi Hosoda, both of Hyogo, all of Japan

[73] Assignees: NSK Ltd., Tokyo; Sanyo Special Steel Co., Ltd., Hyogo, both of Japan

[21] Appl. No.: 251,267

[22] Filed: May 31, 1994

[30] Foreign Application Priority Data

May 31, 1993 [JP] Japan ................................. 5-129762

[51] Int. Cl.⁶ .................................................. C22C 38/32
[52] U.S. Cl. ............................................. 148/330; 148/333
[58] Field of Search ...................................... 148/333, 330

[56] References Cited

U.S. PATENT DOCUMENTS 5,077,003  12/1991  Muraoka et al. ........................ 148/333

*Primary Examiner*—Deborah Yee
*Attorney, Agent, or Firm*—Sughrue, Mion, Zinn, Macpeak & Seas

[57] ABSTRACT

A rail for a linear motion guide bearing is fabricated by using a steel which contains C in a range of from 0.56 to 1.0% by weight, Si in a range of up to 0.15% by weight, Mn in a range from 0.20 to 0.40% by weight, Cr in a range of from 0.30 to 0.70% by weight, and B in a range of from 0.0005 to 0.0035% by weight, whereby the hardness of the track surface of the resultant rail is higher than a Vickers hardness of 700, and the die is not decreased in service 1 life by the cold-drawing of the steel.

1 Claim, 3 Drawing Sheets

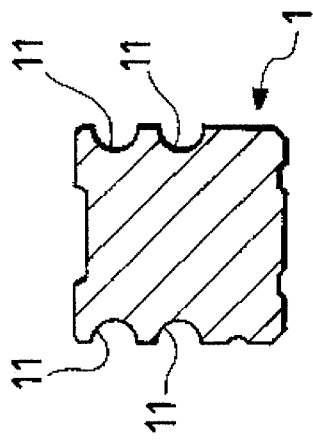
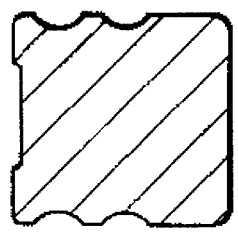
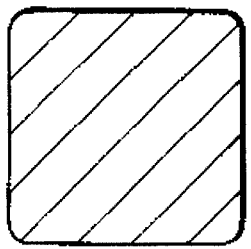
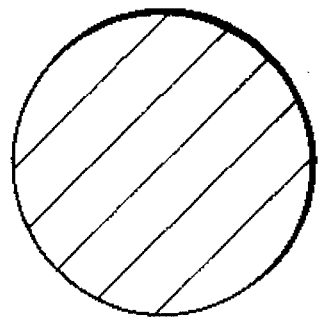
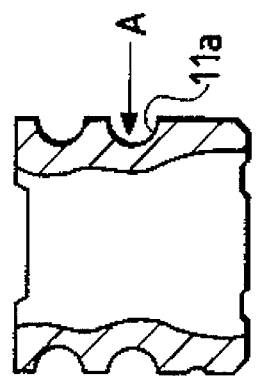

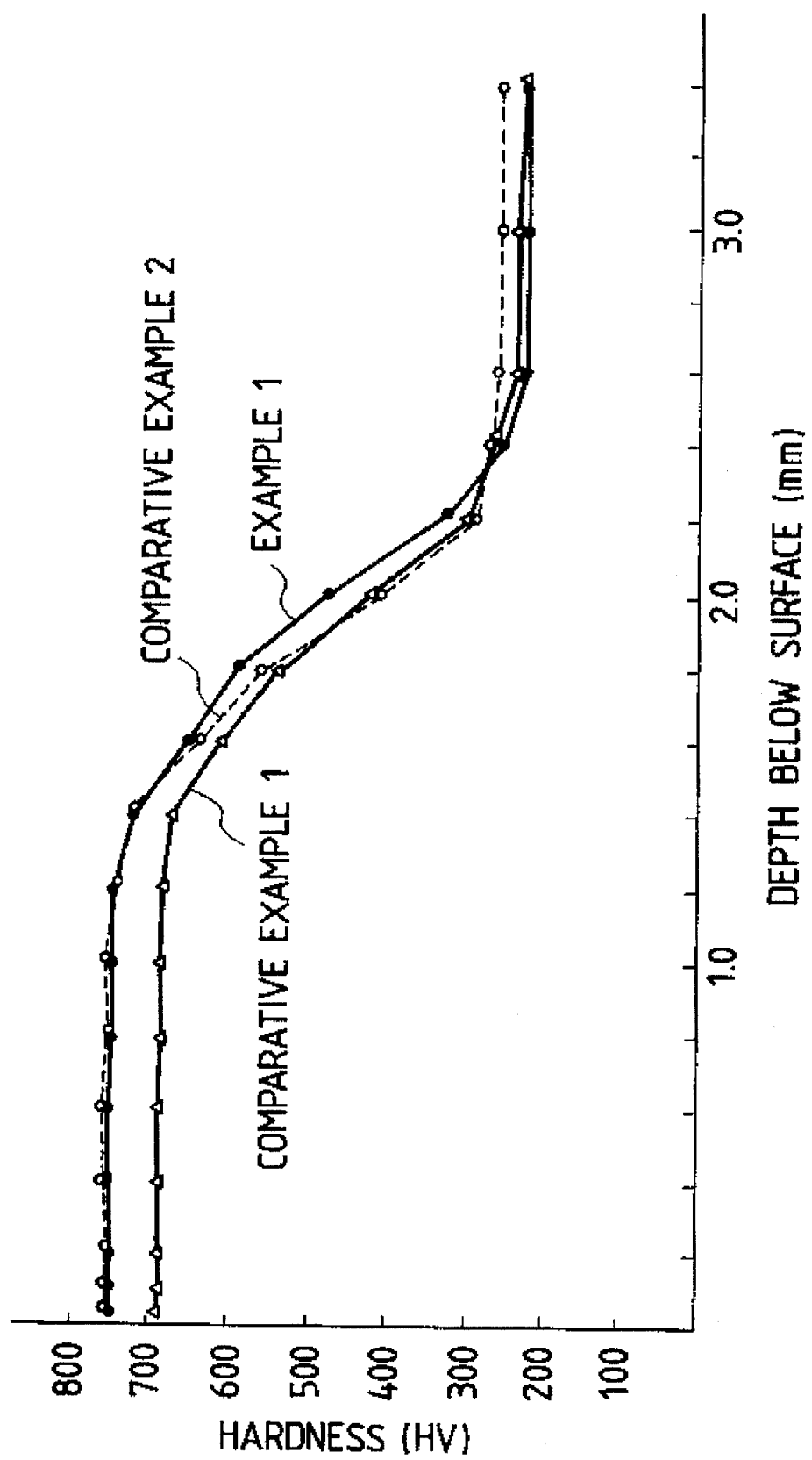

RAIL FOR A LINEAR MOTION GUIDE BEARING

BACKGROUND OF THE INVENTION

The present invention relates to a linear motion guide bearing with a rail which is fabricated by using steel which is cold-drawn and induction-hardened. Particularly, in the rail, the track surface is harder than a conventional rail, wear resistance and cold working characteristic are improved, and service life of a die is increased.

Generally, the rail of a linear motion guide bearing is formed by using a steel bar which is formed by cold drawing and subjected to induction heating. A typical example of steel used for the formation of the rail is a JIS S53C steel and other similar graded steel, because of their good drawability. For example, according to "Linear Motion Guide Unit" mentioned in the magazine "Special Steel", February 1990, pp. 33 to 36 published by Special Steel Association of Japan, steel containing 0.53% C (carbon) and 1.5% Mn (manganese) by weight is employed for the rail of the linear motion guide bearing.

The hardness of the surface layer of steel which has been induction-hardened and tempered is proportional to the content of carbon of the steel. In the case of the aforementioned conventional steel, the content of carbon is relatively small. Hence, even if the heat treatment conditions of the steel are improved, the resultant surface layers vary widely in hardness, so that it is difficult to stably give a hardness higher than a Vickers hardness ($H_v$) of 700 (corresponding to a Rockwell C hardness ($H_R$ C) of 60) to the surface layer.

On the other hand, as the content of carbon of steel increases, the cold working characteristics of the steel is adversely affected. Hence, in the cold-drawing operation, the service life of the die is lowered; that is, the cost for the die is increased, or the cold drawing speed must be decreased; and thus productivity of the cold-drawing process is lowered.

SUMMARY OF THE INVENTION

In view of the foregoing, an object of the present invention is to provide a linear motion guide bearing with a rail which is fabricated by using a steel which is such that the track surface has a hardness over a Vickers hardness of 700 even with the variations in hardness taken into account, and the cold workability of the rail is not adversely affected.

The foregoing object of the invention has been achieved by the provision of the linear motion guide bearing with a rail which is fabricated by using steel which is cold-drawn and induction-hardened, in which, according to the present invention, the steel contains C (carbon) in a range of from 0.56 to 1.0% by weight, Si (silicon) in a range of up to 0.15% by weight, Mn (manganese) in a range of from 0.20 to 0.40% by weight, Cr (chromium) in a range of from 0.30 to 0.70% by weight, and B (boron) in a range of from 0.0005 to 0.0035% by weight.

Further, in the linear motion guide bearing of the present invention, the track surface of the rail has a hardness in the range of from 700 to 800 in Vickers hardness. Before the steel is induction-hardened, the surface of the steel has hardness in the range of from 150 to 175 in Brinell hardness.

BRIEF DESCRIPTION OF THE DRAWINGS

In the accompanying drawings:

FIGS. 1(a) to 1(d) are sectional views for a description of the cold drawn steel which is subjected to primary drawing, intermediate drawing and finish drawing to form a rail for a linear motion guide bearing according to the present invention;

FIG. 2 is an explanatory diagram showing Vickers hardness measuring points in the rail;

FIG. 3 is a graphical representation indicating the relationships between the Vickers hardnesses of steels which have been induction-hardened and then tempered and the Vickers hardness measuring points;

DETAILED DESCRIPTION OF THE EMBODIMENTS

Figure 4:
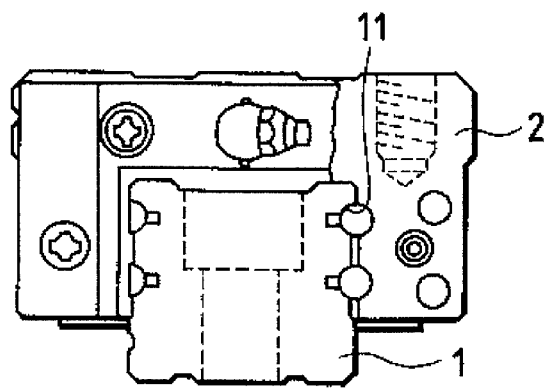
FIG. 4 is a front view, with parts cut away, showing the linear motion guide bearing to which a wearing test is given.

In a linear motion guide bearing of the present invention, its rail is fabricated by using steel which is cold-drawn induction-hardened. The specific feature of the present invention resides in that the steel contains: C (carbon) in a range of from 0.56 to 1.0% by weight, Si (silicon) in a range of up to 0.15% by weight, Mn (manganese) in a range of from 0.20 to 0.40% by weight, Cr (chromium) in a range of from 0.30 to 0.70% by weight, and B (boron) in a range of from 0.0005 to 0.0035% by weight.

That is, in the steel, the content of carbon is made larger than that, for instance, in a JIS S53C steel, and therefore the surface layer of the steel can be increased in hardness when the steel is induction-hardened and tempered. In addition, the contents of Si and Mn are made smaller than those in JIS S53C steel, which improves not only the cold working characteristic which is lowered with increasing content of carbon, but also the service life of the die used to form the rail. Furthermore, the content of Cr is increased when compared with JIS S53C steel, and B is contained, which prevents the hardenability from being lowered due to the decreasing contents of Si and Mn.

Now, the reason why, in the steel, the contents of those components C, Si, etc. are limited as described above, will be described.

C: 0.56 to 1.0% by Weight

The hardness of the surface layer of a steel which has been induction-hardened and tempered is proportional to the increasing content of carbon; however, when the content of carbon exceeds 1.0% by weight, the cold working characteristic is lowered. Therefore, the content of carbon is set to 1.0% or less by weight. When the content of carbon is 0.56% or more by weight, a hardness higher than a Vickers hardness of 700 can be stably given to the surface layer of the steel. On the other hand, if the content of carbon is relatively high, then the improvement of the hardenability is not sensitive to the addition of B (boron), which is contrary to the intention of the invention that the hardenability is improved by adding B (boron) to compensate for the decrease of the amounts of addition of Si and Mn. Thus, preferably the content of carbon is in a range of from 0.56 to 0.80% by weight.

Si: 0.15% or Less by Weight

Silicon (Si) is an element acting as a deoxidizer; however, when Si is more than 0.15% by weight, then it adversely affects the cold workability of the steel in the present invention. Therefore, the content of Si is set to 0.15% or less by weight. Silicon is naturally present about 0.05% by weight in steel. It is not true that no silicon is contained in steel at all.

Mn: 0.20 to 0.40% by Weight

Manganese (Mn) is an element effective in improving the hardenability of a steel. The effect of manganese is significant when the content of Mn is at least 0.20% by weight; however, if the content of Mn is excessively high, then it will adversely affect the cold workability of the steel. Hence, the content of Mn is ranged from 0.20 to 0.40% by weight. If the content of Mn is decreased to less than 0.20% by weight, then with the steel manufacturing technique at the time of the present invention, the manufacturing cost rises unavoidably.

Cr: 0.30 to 0.70% by Weight

Chromium (Cr) is an element which improves the hardenability of a steel similarly as in the case of manganese (Mn), and accelerates the spheroidizing of carbide. The effect of chromium is significant when the content of Cr is 0.30% or more by weight; however, if the content of Cr is excessively high, then the cold workability of the steel is adversely affected. Thus, the content of Cr is ranged from 0.30 to 0.70% by weight.

B: 0.0005 to 0.0035% by Weight

When a small quantity of boron (B) is added to a steel, it improves the hardenability of the steel. However, the addition of boron less than 0.0005% by weight is not effective, and if the content of boron exceeds 0.0035% by weight, then the improvement of the hardenability is saturated.

Thus, in the case where a rail for a linear motion guide bearing is formed by using the above-described steel, a hardness higher than a Vickers hardness of 700 can be stably given to the track surface of the rail by induction quenching. And yet the cold workability of the steel is never adversely affected.

Further, before induction quenching the rail, the hardness of the surface layer of the steel is preferably lower in terms of the service life of the die. However, in terms of the components contained in the steel of the present invention, a suitable lower limit of the hardness is the Brinell hardness of 150 (more preferably, no less than 155). Moreover, when the Brinell hardness exceeds 175, the service life of the die becomes short. Therefore, an upper limit of the hardness of the surface layer is the Brinell hardness of 175 (more preferably, no more than 170).

In view of the wear resistance and toughness of the rail, the track surface of the rail of the linear motion guide bearing is preferably in the range of from 700 to 800 in Vickers hardness ($H_v$) (corresponding to the range of from 60 to 64 in Rockwell hardness ($H_R$)). This hardness is obtained in the case where the composition of the steel is determined as described above, and, after the steel is induction-hardened, a tempering temperature in a range of from 150° to 180° C. is employed.

EXAMPLE

For a full understanding of the present invention, examples and comparative examples of the steel will be described bellow.

TABLE 1

|  | C | Si | Mn | P | S | Cr | Al | Ti | B |
|---|---|---|---|---|---|---|---|---|---|
| Example 1 | 0.65 | 0.08 | 0.33 | 0.017 | 0.021 | 0.51 | 0.017 | 0.030 | 0.0021 |
| Example 2 | 0.70 | 0.07 | 0.30 | 0.015 | 0.018 | 0.50 | 0.021 | 0.028 | 0.0025 |
| Example 3 | 0.96 | 0.06 | 0.31 | 0.018 | 0.019 | 0.49 | 0.019 | 0.035 | 0.0030 |
| Comparative Example 1 | 0.53 | 0.25 | 0.78 | 0.017 | 0.020 | 0.27 | 0.014 | 0.003 | — |
| Comparative Example 2 | 0.67 | 0.23 | 0.75 | 0.018 | 0.019 | 0.26 | 0.018 | 0.003 | — |
| Comparative Example 3 | 0.70 | 0.08 | 0.33 | 0.017 | 0.018 | 1.20 | 0.015 | 0.032 | 0.0023 |
| Comparative Example 4 | 1.10 | 0.08 | 0.33 | 0.019 | 0.020 | 0.50 | 0.018 | 0.034 | 0.0024 |

Steels (cold-finished steel bars having a diameter of 40 mm and a length of 5 m) as indicated in the above Table 1 were subjected, as starting materials, to cold drawing under the same conditions according to the following procedure. The steel of Comparative Example 1 corresponds to JIS S53C, and the steel of Comparative Example 2, to SAE 1065. These steels were spheroidizing-annealed and then machined.

The cold drawing operation is carried out as follows: That is, a series of operations consisting of (1) swaging an end of steel (for inserting the end of the steel bars into the hole of the die and being chucked by a drawing machine), (2) low-temperature annealing, (3) forming a lubricant film (phosphate film plus metallic soap film) on the surface of the steel, and (4) drawing the steel bar (primary-drawing, intermediate-drawing and finish-drawing with cemented carbide dies), were carried out. Thus, the steel bar which was round in section as indicated in FIG. 1(a) was changed in section as indicated in FIGS. 1(b), 1(c) and 1(d) in the stated order; that is, the steel bar was converted into a rail 1 having ball grooves 11.

As for each material, a comparison was made for the service lives of the dies. More specifically, in the finish drawing operation severe in dimensional accuracy, after 1,000 steel bars had been drawn with the die, dimensional measurement was carried out for every fifty (50) products, to determine how many bars had been processed before the ball grooves 11 became unacceptable in dimensional accuracy because of the wear of the die. And with the service life of the die for Comparative Example 1 as reference which could handle 2300 steel bars, the service life ratios of the other Examples were calculated. The results of the calculation and the results of measurement of the Brinell hardnesses ($H_B$) of the materials are as indicated in the following Table 2:

TABLE 2

|  | Surface hardness ($H_B$) after spheroidizing-annealed | Surface hardness ($H_V$) after induction-hardened | Service life ratio | Groove's average wear depth ratio |
| --- | --- | --- | --- | --- |
| Example 1 | 155 | 720 | 1.02 | 0.95 |
| Example 2 | 160 | 750 | 1.1 | 0.90 |
| Example 3 | 170 | 760 | 1 | 0.80 |
| Comparative Example 1 | 165 | 685 | 1 | 1 |
| Comparative Example 2 | 190 | 750 | 0.60 | 0.90 |
| Comparative Example 3 | 180 | 750 | 0.55 | 0.90 |
| Comparative Example 4 | 190 | 760 | 0.40 | 0.75 |

As is apparent from Table 2, in the cases of Examples 1, 2 and 3, the service life ratios of the die are longer than in the case of Comparative Example 1 (the steel corresponding to a JIS S53C steel which is heretofore employed for the rail), and the steels are equal to or higher than the conventional steel in cold drawing characteristic. In the case of Comparative Examples 2, 3 and 4, the die's service lives were was short, about half of the die's service life in the case of Comparative Example 1; that is, the cold drawing characteristics are low, because, although the content of carbon is within the scope of the present invention, other conditions were not satisfied, or the content of carbon was excessively high.

After the rails had been formed by cold-drawing the steel in the above-described manner, its opposing two side surfaces having the ball grooves 11 were induction-hardened (progressive hardening) and then tempered under the following conditions:

| Quenching conditions: | |
| --- | --- |
| Frequency | 30 kHz |
| Voltage | 10 kV |
| Current | 10 A |
| Feeding speed | 8 mm/sec |
| Cooling water flow rate | 35 liters/min |
| Tempering temperature | 160° C. |

After the heat treatment, the Vickers hardness of the track surface (or the ball groove 11a in FIG. 2) of each rail 1 was measured as follows: That is, with a load of 1 kg applied to the track surface in the direction of the arrow A as shown in FIG. 2, the measurement was carried out at several depths below the track surface. The results of the measurements from Example 1 and Comparative Examples 1 and 2 are as indicated in FIG. 3. The Vickers hardnesses of the surfaces after heat-treated are as listed in the aforementioned Table 2.

As is apparent from FIG. 3, in the cases of Example 1 and Comparative Example 2, the region of from the surface to a depth of 1.4 mm is over $H_v$ 700 in hardness; whereas in the case of Comparative Example 1, the same region is less than 700 $H_v$. However, as was described before, the steel of Comparative Example 2 is low in cold drawing characteristic.

Figure 5A:
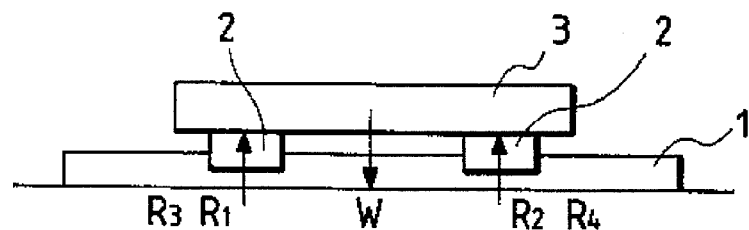
FIGS. 5(a) and 5(b) are a side view and a plane view for a description of a method of applying a load in the wear test.
Figure 5B:
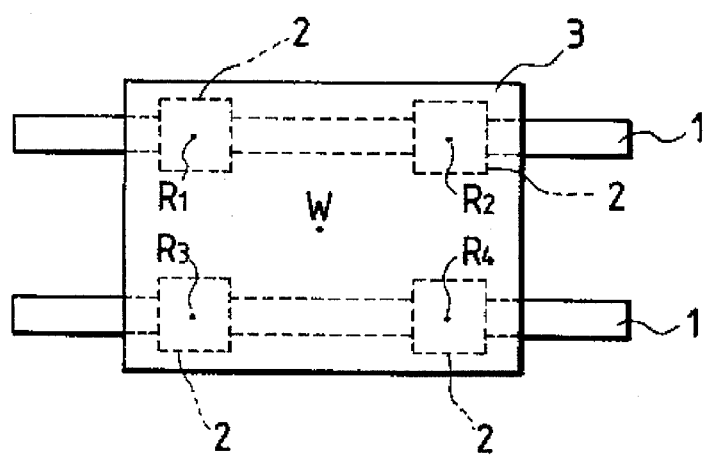

The rails 1, which were manufactured by using the steels of Examples 1 through 3 and Comparative Examples 1 through 4 in the above-described manner, were used to form linear motion guide bearings as shown in FIG. 4, and a wear resistance test was given to three rails per each Example under the following conditions: As shown in FIGS. 5(a) and 5(b), two rails 1 each having two bearings 2 were laid in parallel with each other, and a table 3 was set on the four bearings 2 in such a manner that the four bearings were located at four corners of the table 3, respectively. Under this condition, a load W was applied to the table at the center from above; that is, under the condition that equal reactions R1, $R_2$, $R_3$ and $R_4$ occurred with the bearings 2, respectively, the table was moved back and forth.

| Testing conditions: | |
| --- | --- |
| Rail length | 1.5 m |
| Load | 655 kgf/bearing |
| Testing average speed | 24 m/min |
| Lubricant | Grease lubricant (lithium soap based) |
| Reciprocating distance | 400 mm |

After the table was moved 6400 km in a reciprocation mode, the average wear depth of each rail 1 was measured, and the average wear depth ratio was calculated with the average wear depth of Comparative Example 1 as reference. The results of the calculations are as indicated in the aforementioned Table 2.

As is apparent from Table 2, in the cases of Examples 1 through 3 and Comparative Examples 2, 3 and 4, the average wear depth ratios are in the range of from 0.75 to 0.95, and the wear resistance is much higher than that in the case of Comparative Example 1. However, in the cases of Comparative Examples 2, 3 and 4, the dies were short in service life.

Thus, the steels of Examples 1 through 3 are excellent in cold drawing characteristic. When they are induction-hardened, the surface layers may have a hardness higher than a Vickers hardness of 700. Therefore, in the case where they are used to form the rail of the linear motion guide bearing, the resultant rail is high in wear resistance. In addition, the die is increased in service life. Thus, with such materials, the rails can be fabricated with high productivity.

As described above, in the linear motion guide bearing of the present invention, the composition of the steel used to form the rail therefor is so limited that the hardness of the track surface of the resultant rail is over a Vickers hardness of 700 with the cold working characteristic not being lowered (or with the die's service life being not decreased). Thus, the rail of the linear motion guide bearing can be manufactured with high efficiency.

It is intended that all matter contained in the foregoing description and in the drawings shall be interpreted as illustrative only not as limitative of the invention.

What is claimed is:

1. A rail for a linear motion guide bearing, the rail being fabricated into a required shape with a track surface, by using steel which is cold-drawn and induction-hardened, said steel comprising:

carbon in a range of from 0.56 to 1.0% by weight;
silicon in a range of 0.05 to 0.15% by weight;
manganese in a range of from 0.20 to 0.40% by weight;
chromium in a range of from 0.30 to 0.70% by weight; and
boron in a range of from 0.0005 to 0.0035% by weight, the rail comprising a hardened surface layer having a hardness of a range from 700 to 800 in Vickers hardness ($H_v$) in a surface portion of the rail from the track surface to substantially 1.4 mm in depth.

* * * * *